(12) United States Patent
Hsieh et al.

(10) Patent No.: US 11,268,538 B2
(45) Date of Patent: Mar. 8, 2022

(54) MULTIPLE FUNCTION FAN HOLDER

(71) Applicant: DELL PRODUCTS L.P., Round Rock, TX (US)

(72) Inventors: Nelson Hsieh, Taoyuan (TW); Yi-Wei Lu, Taipei County (TW)

(73) Assignee: DELL PRODUCTS L.P., Round Rock, TX (US)

( * ) Notice: Subject to any disclaimer, the term of this patent is extended or adjusted under 35 U.S.C. 154(b) by 194 days.

(21) Appl. No.: 16/373,927

(22) Filed: Apr. 3, 2019

(65) Prior Publication Data

US 2020/0318654 A1 Oct. 8, 2020

(51) Int. Cl.
*F04D 29/60* (2006.01)
*F04D 29/08* (2006.01)
*F04D 29/40* (2006.01)
*G06F 1/20* (2006.01)

(52) U.S. Cl.
CPC ......... *F04D 29/601* (2013.01); *F04D 29/083* (2013.01); *F04D 29/403* (2013.01); *G06F 1/20* (2013.01)

(58) Field of Classification Search
CPC ...... F04D 29/668; F04D 29/646; F04D 29/40; F04D 29/403; F04D 29/52; F04D 29/522; F04D 29/60; F04D 29/601; F04D 29/64; F04D 29/644; F04D 29/66; F04D 29/661
See application file for complete search history.

(56) References Cited

U.S. PATENT DOCUMENTS

| 5,581,299 | A | 12/1996 | Raney | |
| 6,351,380 | B1 * | 2/2002 | Curlee | F16B 5/065 165/80.3 |
| 6,845,931 | B1 | 1/2005 | Smith | |
| 6,894,897 | B1 * | 5/2005 | Nagurny | H05K 7/20172 165/122 |
| 7,511,955 | B2 | 3/2009 | Yin | |
| 8,337,155 | B2 * | 12/2012 | Yoo | F04D 29/668 415/214.1 |
| 9,493,102 | B2 | 11/2016 | Tang | |
| 9,565,785 | B2 * | 2/2017 | Tsai | F04D 25/08 |
| 10,012,241 | B2 * | 7/2018 | Mutlu Bozay | G06F 1/20 |
| 2007/0154300 | A1 * | 7/2007 | Liang | F04D 29/668 415/119 |
| 2007/0231157 | A1 * | 10/2007 | Chuang | F04D 29/646 416/247 R |
| 2008/0315731 | A1 * | 12/2008 | Reisel | F04D 25/0613 312/223.2 |
| 2009/0009961 | A1 | 1/2009 | Li | |

(Continued)

FOREIGN PATENT DOCUMENTS

| CN | 101297267 A | 10/2008 |
| CN | 101298821 B | 6/2013 |
| CN | 106247118 B | 8/2018 |

(Continued)

*Primary Examiner* — Richard A Edgar
(74) *Attorney, Agent, or Firm* — Jackson Walker LLP; Christopher J. Rourk (57) ABSTRACT

A device is disclosed that include a first component comprising a rigid assembly shot molded to a flexible assembly, a second component comprising a fan housing and wherein the first component is coupled to the second component and the flexible assembly is disposed between the rigid assembly and the second component.

20 Claims, 6 Drawing Sheets

(56) References Cited

U.S. PATENT DOCUMENTS

2013/0101396 A1* 4/2013 Zhou .................... F04D 29/602
　　　　　　　　　　　　　　　　　　　　　　　415/119
2015/0233388 A1* 8/2015 Saturley ............... F04D 29/668
　　　　　　　　　　　　　　　　　　　　　　　415/119

FOREIGN PATENT DOCUMENTS

FI　　　　116096 B　　9/2005
JP　　　4626970 B2　　2/2011

* cited by examiner

FIG. 7

MULTIPLE FUNCTION FAN HOLDER

TECHNICAL FIELD

The present disclosure relates generally to data processing equipment, and more specifically to a multiple function fan holder for holding cooling fans for data processing equipment.

BACKGROUND OF THE INVENTION

Fan assemblies for data processing equipment suffer from numerous design constraints that result in high levels of vibration and leakage from the data processing equipment chassis. These design constraints have not been a problem in the prior art, because leaky and high vibration designs were sufficient for heavier components with lower power density. As such, the problems associated with light, high power components of data processing equipment have not been foreseen, resulting in equipment failures and other issues.

SUMMARY OF THE INVENTION

A fan housing assembly is disclosed that includes a dome sealing assembly that has a rigid assembly, such as plastic, that is shot molded to a flexible assembly, such as rubber or elastomer. The dome sealing assembly is connected to a fan mount assembly that includes a fan housing, where the flexible assembly is disposed between the rigid assembly and the fan mount assembly, to provide fan sealing and isolation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

In prior art data processing systems that include cooling fans disposed inside of a housing, the fan sealing and isolation function was provided in several parts. For example, one component was used to seal a fan to prevent leakage of the draft, but different and separate components were provided to isolate the fan from other components. Because such different and separate components were used, it was also the case that they would be subject to becoming loose, such as from expansion and contraction, vibration and the like. The present disclosure provides a design that overcomes this deficiency of the prior art, by providing fan sealing, fan isolation and protective measures to prevent loosening of the fan assembly.

As the central processor unit thermal design power and the dual inline memory mount count and power is increased in data processing equipment, the fan seal becomes more important, in order to prevent air flow recirculation and to provide sufficient air flow. Likewise, as the hard disk drive capacity increases, the hard disk drive dynamic sensitivity has also increased, and a better solution is needed to isolate the fan vibration to prevent deleterious impacts to hard disk drive dynamics.

In accordance with an example embodiment of the present disclosure, a rubber material or other suitable damping material is used in a dome sealing shape on the top and bottom of a fan mount assembly, to provide a fan sealing function. In this example embodiment, rubber or other suitable damping material is double shot molded to a sealing component that is formed from plastic or other suitable materials, which provides isolation between the fan and an associated fan holder or chassis. The rubber or other suitable damping component retains the fan to prevent it from touching the plastic holder, and also to prevent fan vibrational energy from being transmitted directly to the chassis. A retention clip or other suitable feature can be provided with a suitable retaining configuration, such as an internal diameter that is a smaller than the diameter of a connector, so any deformation of the retention clip as it is coupled to the connector provides a retention force, as well as a tolerance absorbing function.

Figure 1:
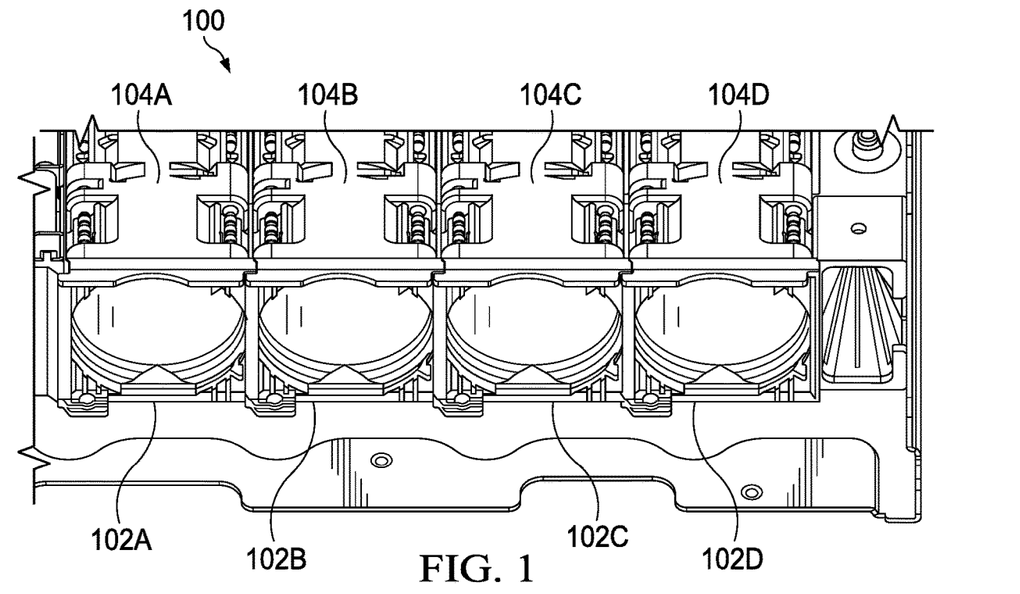
FIG. 1 is a diagram of an assembly for providing fan sealing and isolation, in accordance with an example embodiment of the present disclosure.

FIG. 1 is a diagram of an assembly 100 for providing fan sealing and isolation, in accordance with an example embodiment of the present disclosure. Assembly 100 includes dome sealing assemblies 102A through 102D, which are coupled to fan mount assemblies 104A through 104D, respectively. As will be shown in greater detail below, a sealing and isolation material is disposed between each of the dome sealing assemblies 102A through 102D and its respective fan mount assemblies 104A through 104D, and the dome sealing assemblies 102A through 102D and fan mount assemblies 104A through 104D are configured to augment the fan sealing and isolation function of the sealing and isolation material by their respective designs, as well as by being disposed adjacent to each other in assembly 100.

Figure 2:
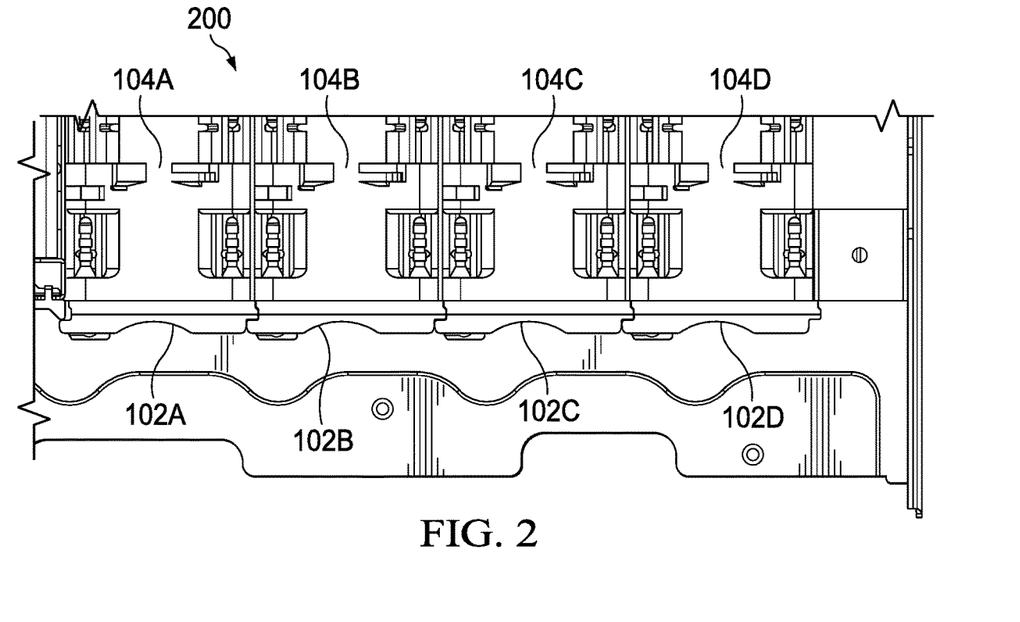
FIG. 2 is a top view of an assembly, in accordance with an example embodiment of the present disclosure.

FIG. 2 is a top view of assembly 100, in accordance with an example embodiment of the present disclosure. The top view of assembly 100 demonstrates the configuration of dome sealing assemblies 102A through 102D and fan mount assemblies 104A through 104D in assembly 100.

Figures 3A, 3B, 3C:
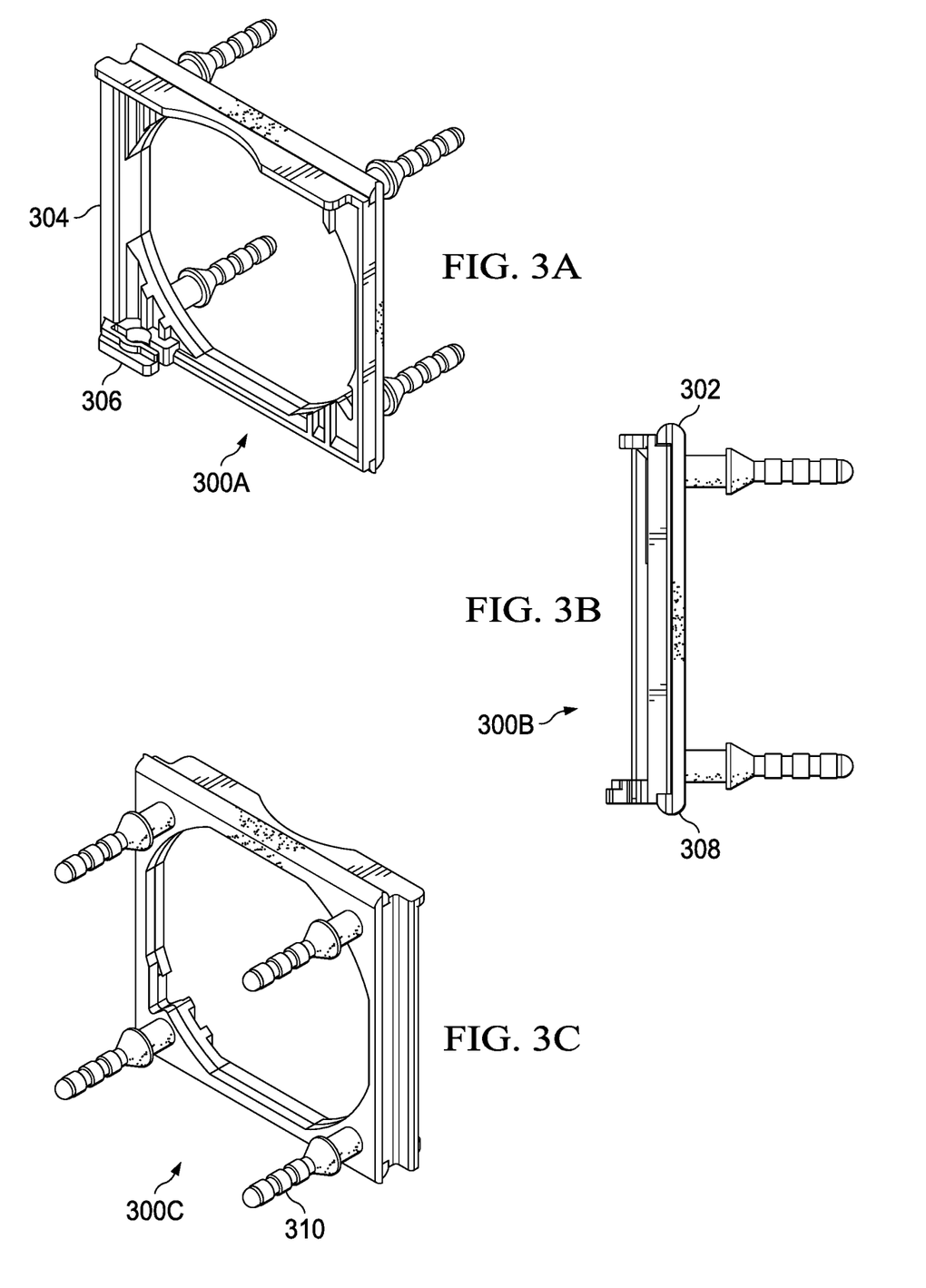
FIGS. 3A through 3C are diagrams of a dome sealing assembly for providing fan sealing and isolation, in accordance with an example embodiment of the present disclosure.

FIGS. 3A through 3C are diagrams of a dome sealing assembly 300 for providing fan sealing and isolation, in accordance with an example embodiment of the present disclosure. Dome sealing assembly 300 includes top fan sealing gasket 302, front fan sealing brace 304, retention clip 306, bottom fan sealing gasket 308 and fan isolation supports 310, which can be double shot molded from plastic, rubber, elastomer or other suitable materials. In one example embodiment, top fan sealing gasket 302, bottom fan sealing gasket 308 and fan isolation supports 310 can be formed from rubber or other pliable materials, such as by double shot molding or in other suitable manners, and front fan sealing brace 304 and retention clip 306 can be formed from plastic or other rigid materials, so as to provide a rigid structural support that is configured to optimize sealing and isolation, with an associated pliable sealing and isolation component that is disposed between the dome sealing assembly and an associated fan mount assembly, chassis or other structure. FIG. 300 includes front isometric view 300A, side view 300B and rear isometric view 300C. Fan isolation supports 310 each further comprise a self-locking feature, such as a flared retaining structure with an angular front end that can be inserted into the penetration and a perpendicular rear end that locks against the opposite surface of the penetration.

Figure 4A:
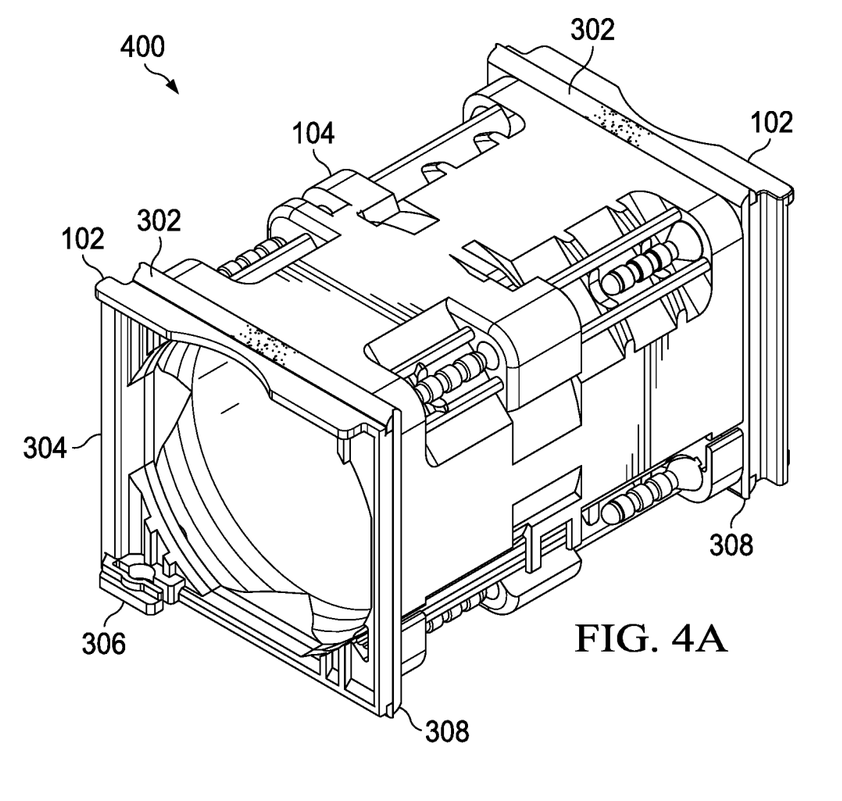
FIGS. 4A and 4B are diagrams of a dome sealing assembly coupled to a fan mount assembly for providing fan sealing and isolation, in accordance with an example embodiment of the present disclosure.
Figure 4B:
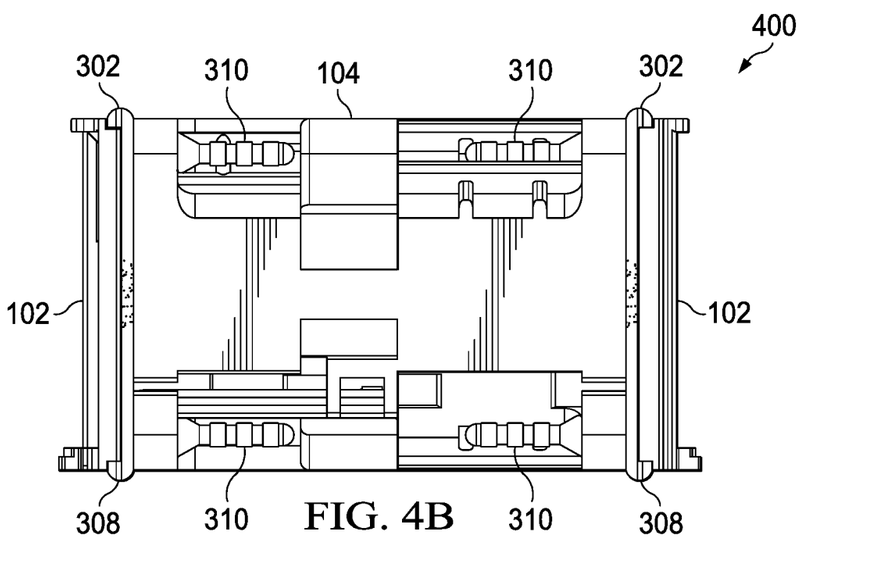

FIGS. 4A and 4B are diagrams of a dome sealing assembly 102 coupled to a fan mount assembly 104 for providing fan sealing and isolation, in accordance with an example embodiment of the present disclosure. Top fan sealing gasket 302 and bottom fan sealing gasket 308 provide a seal for the combination of dome sealing assembly 102 and fan mount assembly 104, which are typically disposed in an assembly adjacent to other dome sealing assemblies 102 and fan mount assemblies 104, or other chassis structures that provide sealing and isolation. Fan sealing brace 304 and retention clip 306 provide additional sealing and isolation, and fan isolation supports 310 extend through penetrations in fan mount assembly 104 to secure dome sealing assembly 102 to fan mount assembly 104.

Figure 5:
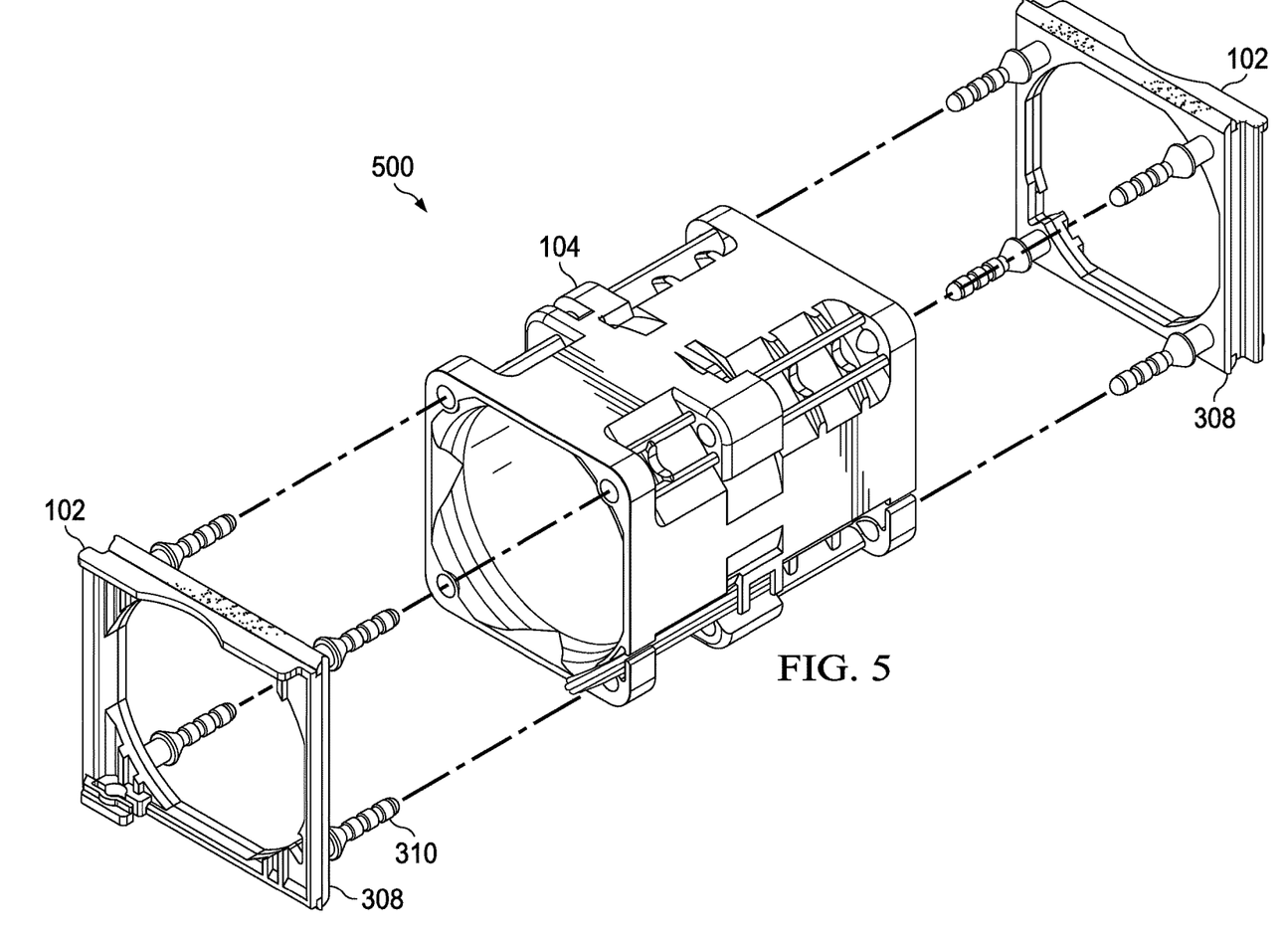
FIG. 5 is an exploded view of a dome sealing assembly coupled to a fan mount assembly for providing fan sealing and isolation, in accordance with an example embodiment of the present disclosure.

FIG. 5 is an exploded view of a dome sealing assembly 102 coupled to a fan mount assembly 104 for providing fan sealing and isolation, in accordance with an example embodiment of the present disclosure. The alignment of fan isolation supports 310 with penetrations in fan mount assembly 104 can be seen, and when dome sealing assembly 102 is coupled to fan mount assembly 104 by inserting fan isolation supports 310 into the penetrations, top fan sealing gasket 302 and bottom fan sealing gasket 308 provide a seal for the combination of dome sealing assembly 102 and fan mount assembly 104.

Figure 6:
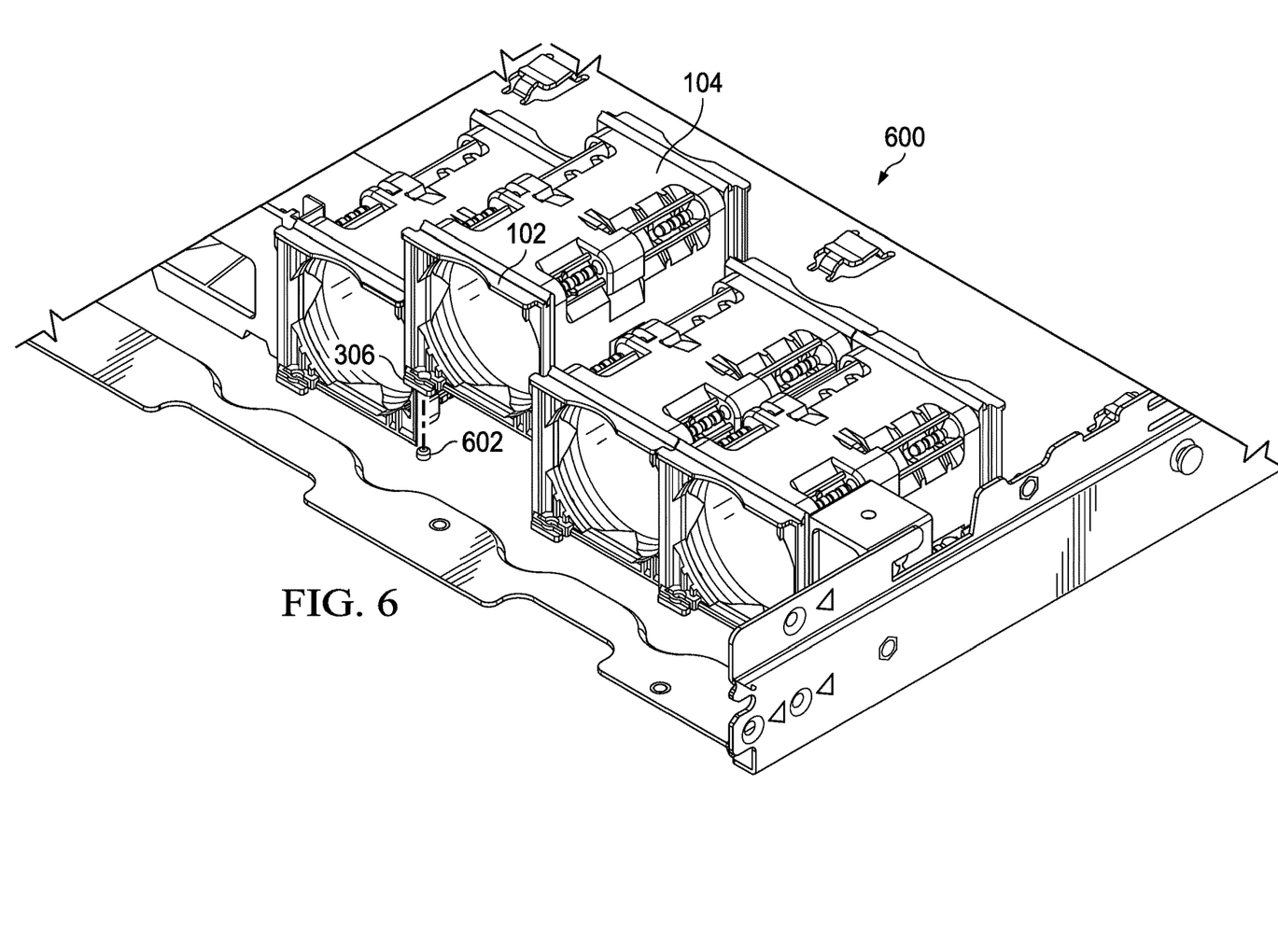
FIG. 6 is a diagram of a chassis with a dome sealing assembly coupled to a fan mount assembly for providing fan sealing and isolation, in accordance with an example embodiment of the present disclosure.

FIG. 6 is a diagram of a chassis 600 with dome sealing assembly 102 coupled to a fan mount assembly 104 for providing fan sealing and isolation, in accordance with an example embodiment of the present disclosure. Retention clip 306 of dome sealing assembly 102 couples to hook 602, to secure the combination of dome sealing assembly 102 and fan mount assembly 104 to chassis 600. By forming retention clip 306 with a smaller inner diameter than the outer diameter of hook 602, retention clip 306 will slightly deform when it engages hook 602, and will exert a retention force to hold the combination of dome sealing assembly 102 and fan mount assembly 104 to chassis 600.

Figure 7:
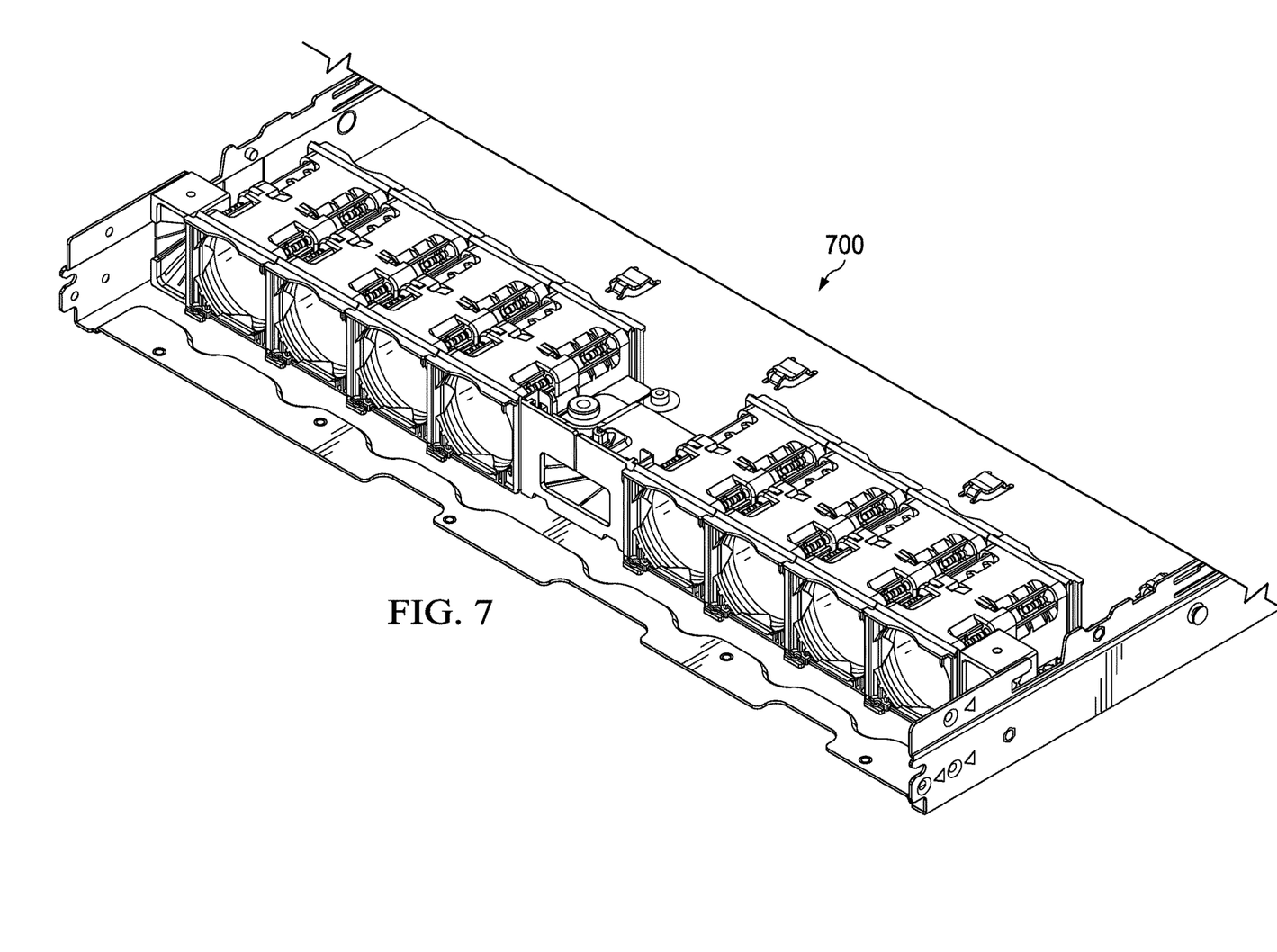
FIG. 7 is a diagram of a fan assembly, in accordance with an example embodiment of the present disclosure.

FIG. 7 is a diagram of a fan assembly 700, in accordance with an example embodiment of the present disclosure. Fan assembly 700 shows eight combinations of dome sealing assembly 102 and fan mount assembly 104 coupled to chassis 600, with additional sealing and isolation provided by other structural components of chassis 600. In this manner, fan assembly 700 provides for sealing and isolation on a system-wide basis, to effectively seal the fans from the outside environment and to isolate vibration from the fans from impacting the operations of components contained within chassis 600.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A device comprising:
   a first component comprising a rigid assembly shot molded to a flexible assembly formed from a single material that extends away from a planar surface of the rigid assembly, the flexible assembly comprising at least two isolation supports joined by a seal extending either above a first surface or below a second surface of the rigid assembly;
   a second component comprising a fan housing;
   and wherein the first component is coupled to the second component and the flexible assembly is disposed between the rigid assembly and the second component.

2. The device of claim 1 further comprising a third component identical to the first component coupled to a first side of the second component, wherein the first component is coupled to a second side of the second component.

3. The device of claim 1 further comprising a third component identical to the first component coupled to a first side of the second component, wherein the first component is coupled to a second side of the second component and the second side is opposite to the first side, and the second component includes penetrations configured to receive the flexible assemblies.

4. The device of claim 1 wherein the flexible assembly comprises a top seal that extends above the first surface of the rigid assembly.

5. The device of claim 1 wherein the seal comprises a top seal that extends above the first surface of the rigid assembly and a bottom seal that extends below the second surface of the rigid assembly and a continuous connection between the top seal and the bottom seal.

6. The device of claim 1 wherein the seal comprises a top seal that extends above the first surface of the rigid assembly and a bottom seal that extends below the second surface of the rigid assembly, and wherein the first surface is opposite from the second surface.

7. The device of claim 1 wherein the at least two isolation supports comprises an isolation support that extends into a penetration of the second component.

8. The device of claim 1 wherein the at least two isolation supports comprises a plurality of isolation supports that each extend into a corresponding penetration of the second component.

9. The device of claim 1 wherein the at least two isolation supports comprises an isolation support at each of four corners, where each isolation support extends into a corresponding penetration of the second component.

10. The device of claim 1 wherein the at least two isolation supports comprises an isolation support at each of four corners, where each isolation support extends into a corresponding penetration of the second component at each of four corners.

11. The device of claim 1 wherein the first component and the second component form a fan housing assembly, and further comprising a plurality of adjacent fan housing assemblies.

12. The device of claim 1 wherein the rigid assembly further comprises a retention clip.

13. The device of claim 1 wherein the rigid assembly further comprises a retention clip coupled to a hook of a chassis.

14. The device of claim 1 wherein the first component and the second component form a fan housing assembly, and further comprising a plurality of adjacent fan housing assemblies, wherein each rigid assembly of each fan housing assembly further comprises a retention clip.

15. The device of claim 1 wherein the first component and the second component form a fan housing assembly, and further comprising a plurality of adjacent fan housing assemblies, wherein each rigid assembly of each fan housing assembly further comprises a retention clip coupled to a hook of a chassis.

16. The device of claim 1 wherein the at least two isolation supports comprises an isolation support having a self-locking feature.

17. The device of claim 1 wherein the at least two isolation supports comprises an isolation support having a flared retaining structure with an angular front end.

18. The device of claim 1 wherein the at least two isolation supports comprises an isolation support having a flared retaining structure with an angular front end configured to be inserted into a penetration of the second component and a perpendicular rear end that locks against the opposite surface of the penetration.

19. The device of claim 1 wherein the at least two isolation supports comprises an isolation support having a flared retaining structure with an angular front end configured to be inserted into a penetration on a first surface of the second component and a perpendicular rear end that locks against a second surface of the second component.

20. A device comprising: a first component comprising a rigid assembly coupled to a flexible assembly that extends away from a planar surface of the rigid assembly, the flexible assembly comprising at least two isolation supports joined by a seal extending either above a first surface or below a second surface of the rigid assembly; a second component comprising a fan housing; and wherein the flexible assembly extends into the second component.

* * * * *

UNITED STATES PATENT AND TRADEMARK OFFICE
CERTIFICATE OF CORRECTION

PATENT NO. : 11,268,538 B2
APPLICATION NO. : 16/373927
DATED : March 8, 2022
INVENTOR(S) : Nelson Hsieh et al.

Page 1 of 1

It is certified that error appears in the above-identified patent and that said Letters Patent is hereby corrected as shown below:

In the Claims

1. In Column 6, Line 11, in Claim 1, delete "and" and insert the same at Line 10, after "housing;" as a continuation point.
2. In Column 7, Line 25, in Claim 20, delete "a first component comprising a" and insert the same at Line 26, before "rigid" as a sub-point.
3. In Column 7, Line 30, in Claim 20, delete "a second component" and insert the same at Line 31, before "comprising" as a sub-point.
4. In Column 7, Line 31, in Claim 20, delete "wherein the flexible assembly" and insert the same at Line 32, before "extends" as a sub-point.

Signed and Sealed this
Twenty-ninth Day of November, 2022

Katherine Kelly Vidal
*Director of the United States Patent and Trademark Office*